United States Patent [19]

Kuwahara

[11] Patent Number: 5,664,199
[45] Date of Patent: Sep. 2, 1997

[54] MICROCOMPUTER FREE FROM CONTROL OF CENTRAL PROCESSING UNIT (CPU) FOR RECEIVING AND WRITING INSTRUCTIONS INTO MEMORY INDEPENDENT OF AND DURING EXECUTION OF CPU

[75] Inventor: Kazuyoshi Kuwahara, Kanagawa, Japan

[73] Assignee: NEC Corporation, Tokyo, Japan

[21] Appl. No.: 405,918

[22] Filed: Mar. 16, 1995

Related U.S. Application Data

[63] Continuation of Ser. No. 61,089, May 12, 1993, abandoned.

[30] Foreign Application Priority Data

| May 12, 1992 | [JP] | Japan | 4-118654 |
| Sep. 3, 1992 | [JP] | Japan | 4-235765 |

[51] Int. Cl.$^6$ .................................................. G06F 9/46
[52] U.S. Cl. .................................... 395/734; 395/733
[58] Field of Search .................................. 395/375, 775

[56] References Cited

U.S. PATENT DOCUMENTS

| 4,445,173 | 4/1984 | Pilat et al. | 395/375 |
| 4,782,486 | 11/1988 | Lipcon et al. | 371/21.5 |
| 4,783,731 | 11/1988 | Miyazaki et al. | 395/425 |
| 4,933,846 | 6/1990 | Humphrey et al. | 395/325 |
| 5,021,993 | 6/1991 | Matoba et al. | 395/775 |
| 5,036,458 | 7/1991 | Matsushima et al. | 395/775 |
| 5,053,949 | 10/1991 | Allison et al. | 395/375 |
| 5,109,521 | 4/1992 | Culley | 395/800 |
| 5,216,672 | 6/1993 | Tatosian et al. | 371/21.1 |
| 5,274,831 | 12/1993 | Katsuta | 395/800 |
| 5,335,331 | 8/1994 | Murao et al. | 395/375 |
| 5,450,610 | 9/1995 | Watanabe et al. | 395/800 |

*Primary Examiner*—Krisna Lim
*Attorney, Agent, or Firm*—Whitham, Curtis, Whitham & McGinn

[57] ABSTRACT

A microcomputer includes a program memory storing a string of instructions for a program, a central processing unit executing each instruction read out from the program memory, an instruction memory having an address area different from the program memory, a serial communication unit responding to data supplied in series thereto and writing instructions into the instruction memory in synchronism with an operation of the central processing unit, and an interrupt control unit responding to an interrupt request to cause the central processing unit to suspend the execution of the program stored in the program memory and to then execute instructions read out from the instruction memory to output internal conditions.

13 Claims, 4 Drawing Sheets

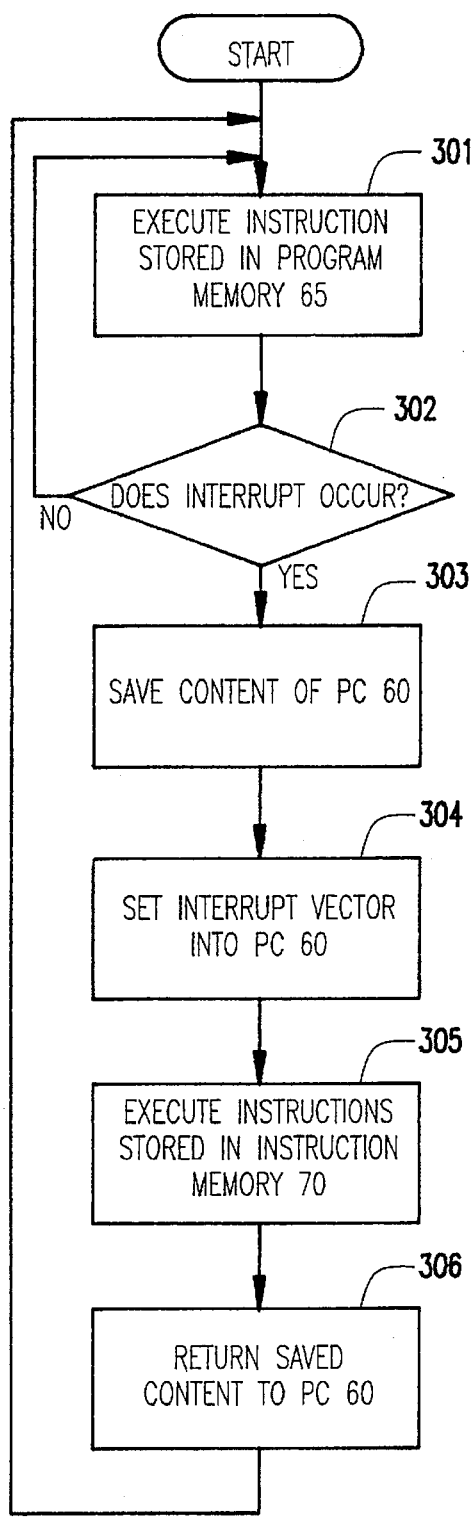
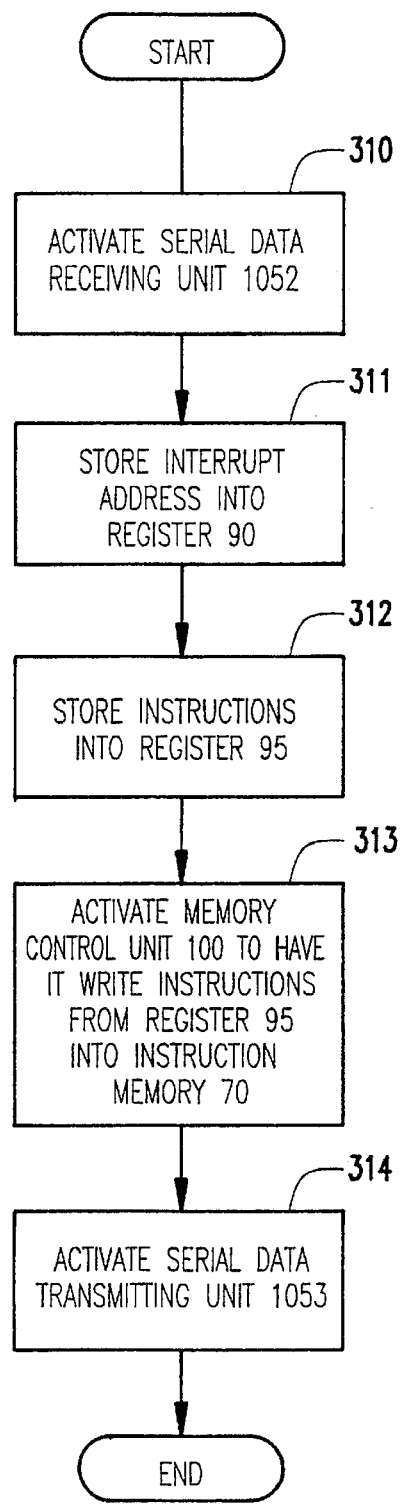
FIG.3A
FIG.3B

MICROCOMPUTER FREE FROM CONTROL OF CENTRAL PROCESSING UNIT (CPU) FOR RECEIVING AND WRITING INSTRUCTIONS INTO MEMORY INDEPENDENT OF AND DURING EXECUTION OF CPU

This is a Continuation of application Ser. No. 08/061,089 filed May 12, 1993 now abandoned.

BACKGROUND OF THE INVENTION

The present invention relates to a microcomputer and, more particularly, to an improvement of a microcomputer which is required to read out internal conditions such as contents of general purpose registers in the course of executing a program.

A microcomputer is widely used in various electronic apparatus to control operations thereof. It is needless to say that the microcomputer executes a string of instructions for a program to perform desired operations. It is therefore required to check whether the program is properly written. Checking the program is carried out by intermittently reading out internal conditions such as contents of general purpose registers during the execution of the program.

For this purpose, an In-Circuit-Emulator (ICE) system is provided as well known in the art. This system includes a microcomputer for emulation (i.e., "emulation microcomputer") executing the program in place of a microcomputer which is actually employed in an electronic apparatus and further having functions of outputting internal conditions under the control of an emulation program. The ICE system is thus provided for every kind or family of microcomputer. In other words, the ICE system is required to be prepared for every kind of microcomputer.

SUMMARY OF THE INVENTION

It is therefore an object of the present invention to provide a microcomputer in which emulation of a program can be carried out without utilizing an ICE system.

It is another object of the present invention to provide a microcomputer which executes instructions not contained in a program to output internal conditions for test.

A microcomputer according to the present invention comprises a program memory for storing a string of instructions for a program, a central processing unit executing each instruction read out from the program memory, an instruction memory having address area different from the program memory, an instruction writing control unit responding to instruction data supplied thereto and writing instructions into the instruction memory in synchronism with an operation of the central processing unit, and an interrupt control unit responding to an interrupt request to cause the central processing unit to suspend the execution of the program stored in the program to the program memory and then execute the instructions read out from the instruction memory. When the inventive structure, emulation can be performed without using an ICE system. Further, the inventive microcomputer is able to execute instructions not contained in a program to output internal conditions for testing.

Thus, the central processing unit can output and the internal conditions by executing the instructions stored in the instruction memory, the internal conditions thus outputted instruction memory can be used to check whether the program is properly written. Moreover, the instructions stored in the can be changed during the execution of the program stored in the program memory.

BRIEF DESCRIPTION OF THE DRAWINGS

The above and other objects, advantages and features of the present invention will be more apparent from the following description taken in conjunction with accompanying drawings, in which:

FIGS. 3A and 3B are flow charts for explaining operations of a central processing unit including an operation unit and an instruction decoder unit shown in FIG. 1 and a sequence control unit shown in FIG. 2, respectively;

DETAILED DESCRIPTION OF THE INVENTION

Figure 1:
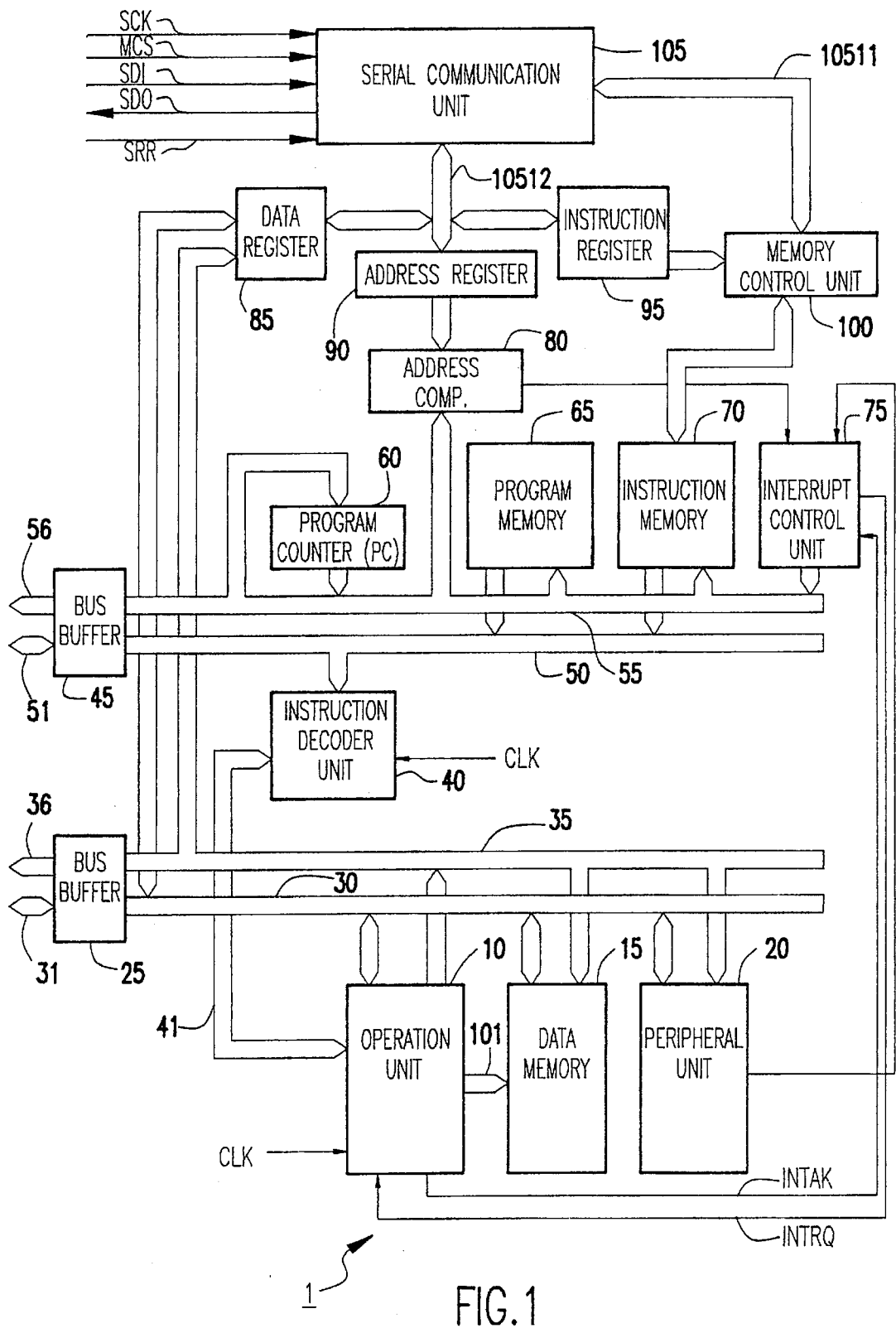
FIG. 1 is a block diagram illustrative of a microcomputer according to an embodiment of the present invention.

Referring to FIG. 1, a microcomputer 1 according to an embodiment of the present invention is fabricated as a single semiconductor chip and includes a program memory 65 storing a string of instructions for a program. This memory 65 is constituted by a read only memory (ROM) or a random access memory (RAM). An address of the memory 65 storing an instruction is designated by a program counter (PC) 60 via an internal instruction address bus 55 and then read out to an instruction decoder unit 40 through an internal instruction bus 50. These buses 50 and 55 are further coupled to external instruction address and instruction buses 56 and 51 through a bus buffer 45 to fetch instructions from an externally provided program memory (not shown). The decoder unit 40 decodes the instruction thus supplied and produces and supplies decoded information to an operation unit 10 through a bus 41. The operation unit 10 thus generates a set of control signals 101 to perform a desired operation on operand data stored in a data memory 15 or a peripheral unit 20 by use of internal operand address and data buses 30 and 35. The operation unit 10 further performs a required operation on external operand data supplied from a bus buffer 25 and external operand address bus 31 and data bus 36. The instruction decoder unit 40 and operation unit 10 operate in synchronism with a clock signal CLK to thereby constitute a central processing unit (CPU).

The microcomputer 1 further includes an interrupt control unit 75. This unit 75 receives an interrupt request from the peripheral unit 20 and issues an interrupt request signal INTRQ to the operation unit 10. The operation unit 10, when accepting that request, returns an interrupt acknowledge signal INTAK to the control unit 75, so that a predetermined vector address is set into the PC 60 from the interrupt control unit 75.

The microcomputer 1 further includes an instruction memory 70 in accordance with the present invention. This memory 70 is constituted of a random access memory (RAM) and is mapped in a predetermined address area which is different from the program memory 65 and the externally provided program memory (not shown). Moreover, the writing operation of instructions into the memory 70 is performed in asynchronism with the operation of the CPU including the operation unit 10, in accordance further with the present invention. To this end, there are provided a memory control unit 100, a set of instruction registers 95 and a serial communication unit 105. The memory control unit 100 responds to command information supplied via a command bus 10511 from the unit 105 and writes into the instruction memory 70 instructions which are temporarily stored in the registers 95 by the serial communication unit 105 via a data bus 10512. The serial communication unit 105 has four inputs which are a serial clock input SCK, a mode designation input MCS, a serial data input SDI and a serial reset input SRR, and one output that is a serial data output SDO.

Further provided in the microcomputer 1 in accordance with the present invention are an address register 90, an address comparator 80 and a set of data registers 85. The address comparator compares the instruction address outputted from the PC 60 with an address temporarily stored in the register 90 and issues an interrupt request to the interrupt controller 75 when both of the addresses are coincident with each other. The address stored in the register 90 is written by the serial communication unit 105. The data registers 85 are coupled to the operand address and data buses 35 and 30, so that the operation unit 10 transfers data representative of its internal conditions into the data registers 85 by execution of the proper instructions. The data stored in the registers 85 are read out by the serial communication unit 105 and then outputted in series via the serial output data SDO.

Figure 2:
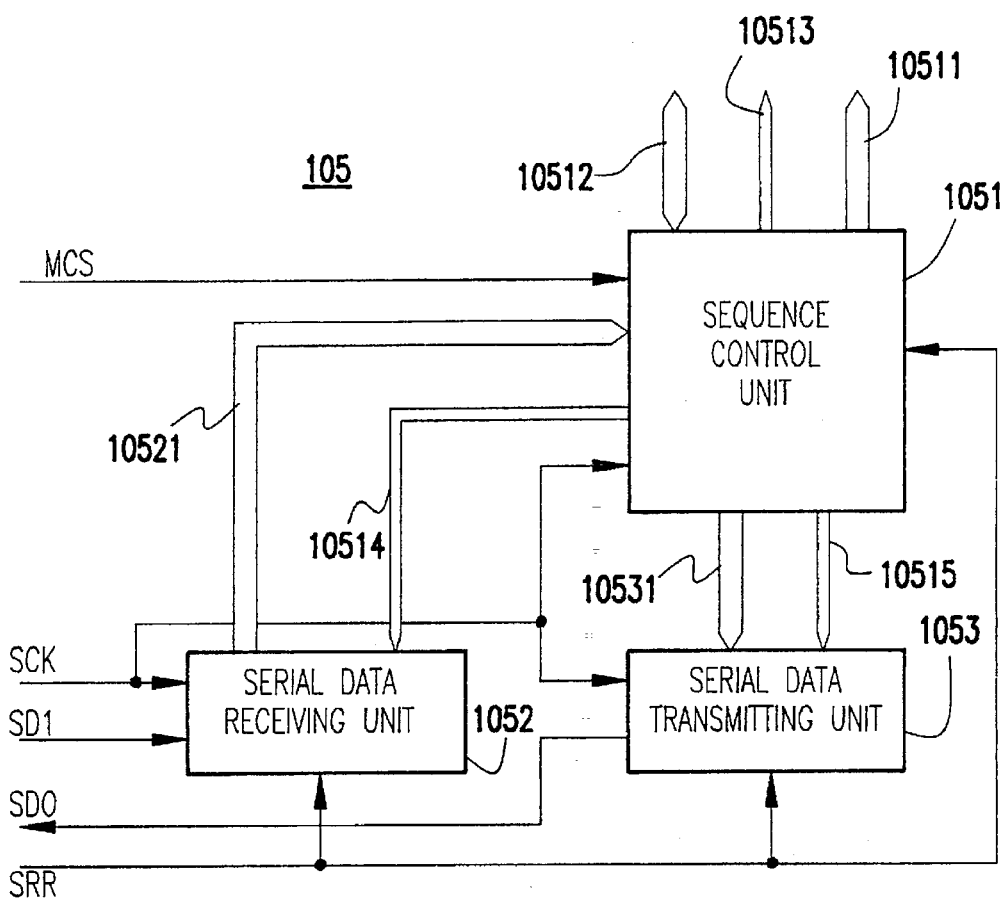
FIG. 2 is a block diagram representative of a serial communication unit shown in FIG. 1.

Turning to FIG. 2, the serial communication unit 105 includes a serial data receiving unit 1052, a serial data transmitting unit 1053 and a sequence control unit 1051. The sequence control unit 1051 controls operations of the serial data receiving and transmitting units 1052 and 1053 as well as those of the memory control unit 100 and the registers 85 and 95 in response to the mode designation signal MCS and the serial clock signal SCK.

In operation, the program counter (PC) 60 accesses the program memory 65 to read out each instruction therefrom. The instruction thus read out is supplied to the decoder unit 40 which in turn supplies the decoded information to the operation unit 10. Thus the operation unit 10 executes each instruction stored in the program memory 65, as shown in FIG. 3A as Step 301. Each time one instruction is executed, the operation unit 10 monitors the level of the interrupt request signal INTRQ to check whether an interrupt request is issued (Step 302). If not, the procedure shifts to Step 301 to execute the next instruction.

On the other hand, the serial communication unit 105 operates in accordance with the flow chart shown in FIG. 3B in asynchronism with the operation of the CPU including the unit 10. That is, the serial communication unit 105 operates in parallel to the program execution of the CPU including the operation unit 10. More specifically, the mode designation signal MCS informs the sequence control unit 1051 of the serial data input mode, so that the unit 1051 activates the serial data receiving unit 1052 by a set of control signals 10514 to receive serial data transferred in synchronism with the serial clock signal SCK (Step 310). The unit 1052 thus receives the serial data SDI and converts them into the parallel data. The parallel data thus derived are supplied to the control unit 1051 via a bus 10521. The mode designation signal MCS further represents the meaning of each parallel data. Accordingly, the interrupt address is stored into the address register 90 (Step 311) and a set of instructions are stored into the registers 95 (Step 312) through the bus 10512 and control signals 10513. The sequence control unit 1051 then receives a command to activate the memory control unit 100. As a result, the memory control unit 100 is activated to write the instructions from the registers 95 into the instruction memory 70 (313).

The address comparator 80 compares the address from the PC 60 with the interrupt address stored in the address register 90, so that when the PC 60 outputs the address that is coincident with the interrupt address, the comparator 80 issues an interrupt request to the interrupt control unit 75. The unit 75 thus produces and supplies the interrupt request signal INTRQ to the operation unit 10.

In Step 302 in FIG. 3A the answer "yes" is derived, so that Step 303 is carried out to save the content of the PC 60 into a stack area (not shown). The operation unit thereafter returns the interrupt acknowledge signal INTAK to the interrupt control unit 75, so that the interrupt vector is set into the PC 60 (Step 304). The interrupt vector corresponds to the leading address of the address area allotted to the instruction memory 70, so the instruction stored in the memory 70 is read out therefrom and then supplied to the instruction decoder 40. Thus, the CPU including the operation unit 10 starts executing the instructions in the memory 70 (Step 305). In the execution of a string of instructions stored in the memory 70, the internal conditions such as data of general purpose registers (not shown) included in the operation unit 10, predetermined addresses of the data memory 15 or the peripheral unit 20 are transferred to the data registers 85. The last one of the instructions stored in the memory 70 is a return instruction, so that the saved content is returned to the PC 60 (Step 306). The CPU thus resumes the execution of the suspended program.

On the other hand, the serial communication unit 105 is brought into the serial data output mode by the mode designation signal MCS. Accordingly, the data stored in the data registers 85 are transmitted in series by means of the serial data transmitting unit 1053 (step 314).

As described above, the internal conditions of the microcomputer 1 can be read out externally during the execution of the program stored in the program memory 65. The check of the program is thus carried out by use of the microcomputer itself. Moreover, the string of instructions to be written into the memory 70 can be changed and modified during the program execution without disturbing the operation of the CPU including the operation unit 10, so that various internal data can be read out and checked. Furthermore, the interrupt address can be also changed during the program execution.

Although not shown in FIG. 1, a reset signal is generally supplied to the microcomputer 1 to bring it into an initial state. In that case, the PC may be set with an address corresponding to the leading address of the address area allotted to the instruction memory 70. The instruction memory 70 would be thereby accessed irrespective of not being written with desired instructions, resulting in an error in operation.

Figure 4:
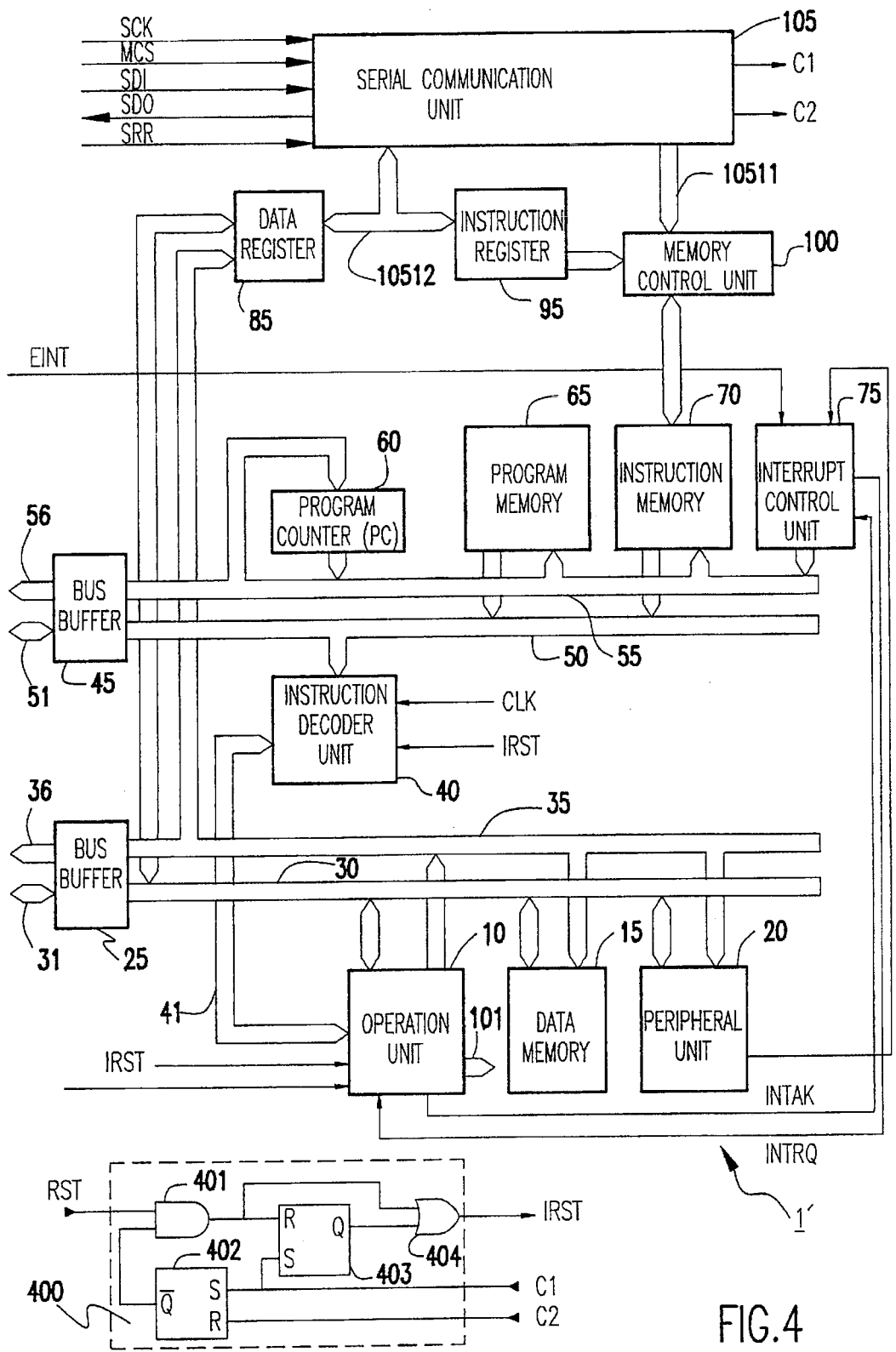
FIG. 4 is a block diagram illustrative of a microcomputer according to another embodiment of the present invention.

In order to prevent such an error in operation, a reset signal control circuit 400 is further provided in a microcomputer 1' as shown in FIG. 4 as another embodiment of the present invention. This circuit 400 receives an external reset signal RST and produces an internal reset signal IRST under the control of control signals C1 and C2 supplied from the serial communication unit 105, the internal reset signal IRST being in turn supplied to the decoder unit 40 and the operation unit 10. The circuit 400 includes an AND gate 401, two S-R flip-flop circuits 402 and 403 and an OR gate 404 which are connected as shown. It is noted that this microcomputer 1' is not equipped with the address register 90 and comparator 80 and an external interrupt request signal EINT is employed, instead.

Figure 5:
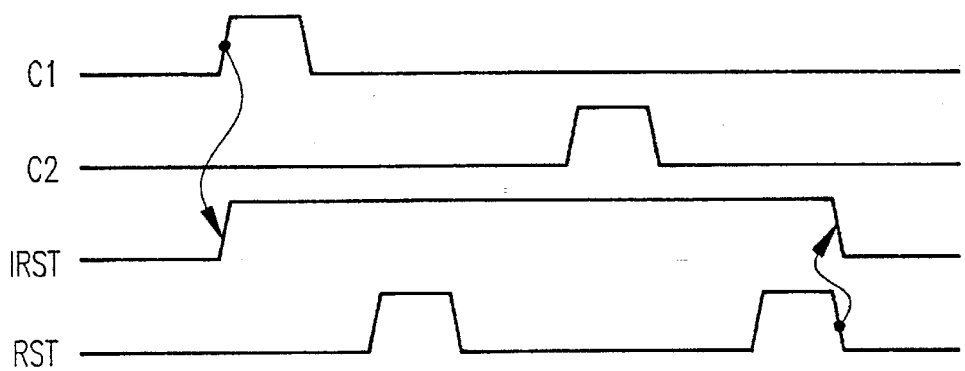
FIG. 5 is a timing chart for explaining an operation of a reset signal control circuit shown in FIG. 4.

In an initial state, the serial communication unit 105 receives a reset command, so that the control signal C1 is generated to set the flip-flops 402 and 403. Accordingly, the internal reset signal IRST is changed to the active high level, as shown in FIG. 5. The CPU including the operation unit 10 is thereby brought into a reset state to stop its operation. The AND gate 401 is made closed to mask the external reset signal RST. During the reset state of the CPU, the serial communication unit 105 operates in accordance with the flow chart shown in FIG. 3B to set desired instructions into the registers 90 and 95 (the Step 311 being omitted in the present embodiment, however), the instructions in the registers being thereafter written into the instruction memory 70 by the memory control unit 100. The serial communication unit 105 then receives a reset release command to generate the control signal C2. The flip-flop 402 is thereby reset to open the AND gate 401. When the external reset signal RST is thereafter supplied, the internal reset signal IRST is changed to the inactive low level (see FIG. 5). The CPU including the operation unit 10 is thus allowed to execute the program stored in the memory 65 as well as the instructions stored in the memory 70.

When the external interrupt request signal EINT is supplied to the interrupt control unit 75 during the program execution, the CPU suspends the program and then executes the instructions stored in the memory 70.

As described hereinbefore, the microcomputer according to the present invention can suspend the execution of the program in an arbitrary timing and then read out the internal conditions. Moreover, internal conditions to be read out are changeable and controllable.

It is apparent that the present invention is not limited to the above embodiments but may be changed and modified without departing from the scope and spirit of the invention.

What is claimed is:

1. A microcomputer comprising:

a program memory for storing first instructions for a program;

a central processing unit for executing said first instructions stored in said program memory;

an instruction memory provided independently of said program memory;

a communication unit for receiving a plurality of second instructions from an external source and for writing said second instructions into said instruction memory independently of and during execution of said first instructions by said central processing unit; and means for causing said central processing unit to suspend the execution of said first instructions and to then execute said second instructions written into said instruction memory, said central processing unit transferring data indicative of internal conditions thereof to said communication unit by executing said second instructions and thereafter resuming the execution of said first instructions, said communication unit transferring said data to said external source independently of execution of any one of said first and second instructions, wherein said communication unit includes a data register, said central processing unit accessing said data register by executing said second instructions to transfer and store said data to said data register, and wherein said communication unit further includes a transfer unit responding to a command from said external source to transfer said data stored in said data register to said external source independently of the execution of said first and second instructions by said central processing unit.

2. A microcomputer comprising:

a program memory for storing first instructions for a program;

a central processing unit for executing said first instructions;

an instruction memory provided independently of said program memory;

an instruction register provided independently of said program memory and said instruction memory;

a communication unit including first means free from control of said central processing unit and responsive to a first command from an external source for receiving a plurality of second instructions from said external source in a serial data transfer manner and writing each of said second instructions into said instruction register, said communication unit further including second means free from control of said central processing unit and responsive to a second command from said external source for producing instruction write-enable information;

a memory control unit free from control of said central processing unit and responding to said instruction write-enable information to write each of said second instructions stored in said instruction register into said instruction memory;

a data register operatively coupled to said central processing unit; and control means for causing said central processing unit to suspend execution of said first instructions and to then execute said second instructions stored in said instruction memory, said central processing unit accessing said data register by executing said second instructions to store in said data register data indicative of internal conditions thereof and thereafter resuming the execution of said first instructions, said communication unit further including third means free from control of said central processing unit and responsive to a third command from said external source for transmitting said data stored in said data register to said external source in said serial data transfer manner.

3. The microcomputer as claimed in claim 2, wherein said communication unit further includes fourth means free from control of said central processing unit and responsive to a fourth command from said external source for receiving and outputting a break address, wherein said control means includes an address register, said fourth means writing said break address into said address register, said control means further including an address comparator for comparing said break address stored in said address register with an instruction address designating one of said first instructions to be executed and for producing an interrupt signal when said break address is coincident with said instruction address and an interrupt control unit responding to said interrupt signal to cause said central processing unit to suspend the execution of said first instructions and to then execute said second instruction.

4. The microcomputer as claimed in claim 2, wherein said control means includes an interrupt control unit responding to an interrupt request signal issued by said external source and causing said central processing unit to suspend the execution of said first instructions and to then execute said second instructions.

5. The microcomputer as claimed in claim 2, further comprising a reset control circuit responding to a first control signal to bring said central processing unit into a reset state to stop an operation of said central processing unit, said communication unit further including means responsive to a reset command from said external source for generating said first control signal, said second instructions being written into said instruction register by said second means and then into said instruction memory by said memory control unit during said reset state of said central processing unit.

6. The microcomputer as claimed in claim 2, wherein said communication unit further includes fourth means free from control of said central processing unit and responsive to a fourth command from said external source for receiving and outputting a break address, and wherein said control means includes an address register.

7. The microcomputer as claimed in claim 6, wherein said fourth means writes said break address into said address register, said control means further including an address comparator for comparing said break address stored in said address register with an instruction address designating one of said first instructions to be executed and for producing an interrupt signal when said break address is coincident with said instruction address and an interrupt control unit responding to said interrupt signal to cause said central processing unit to suspend the execution of said first instructions and to then execute said second instruction.

8. The microcomputer as claimed in claim 2, further comprising a reset control circuit responding to a first control signal to bring said central processing unit into a reset state to stop an operation of said central processing unit.

9. The microcomputer as claimed in claim 8, wherein said communication unit further includes means responsive to a reset command from said external source for generating said first control signal, said second instructions being written into said instruction register by said second means and then into said instruction memory by said memory control unit during said reset state of said central processing unit.

10. A microcomputer comprising:

a program memory for storing a first instruction for a program;

a processor for executing said first instruction stored in said program memory;

an instruction memory provided independently of said program memory;

a communication unit for independently receiving a second instruction from an external source and for writing said second instruction into said instruction memory independently of and during execution of said first instruction by said processor; and means for causing said processor to suspend the execution of said first instruction and to then execute said second instruction written into said instruction memory, wherein said communication unit includes a data register, said processor accessing said data register by executing said second instruction to transfer and store data to said data register, and wherein said communication unit further includes a transfer unit responding to a command from said external source to transfer said data stored in said data register to said external source independently of the execution of said first and second instructions by said processor.

11. The microcomputer as claimed in claim 10, wherein said data is indicative of internal conditions of said processor, and wherein said processor transfers said data to said communication unit by executing said second instruction and thereafter resumes the execution of said first instruction.

12. The microcomputer as claimed in claim 10, wherein said communication unit transfers said data to said external source independently of execution of any one of said first instruction and said second instruction.

13. The microcomputer as claimed in claim 11, wherein said communication unit transfers said data to said external source independently of execution of any one of said first instruction and said second instruction.

* * * * *